No. 634,942. Patented Oct. 17, 1899.
F. C. HARDING.
BICYCLE DRIVING GEAR.
(Application filed July 20, 1898.)
(No Model.)
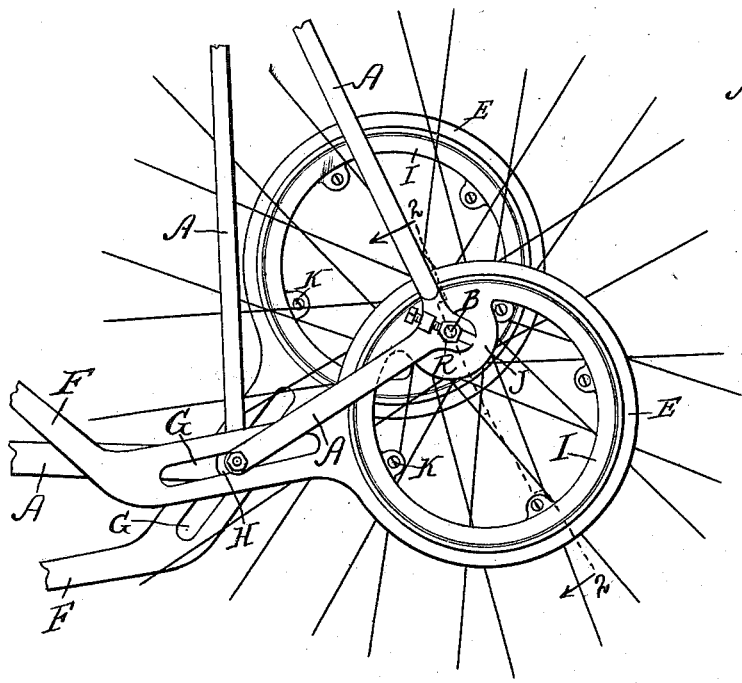
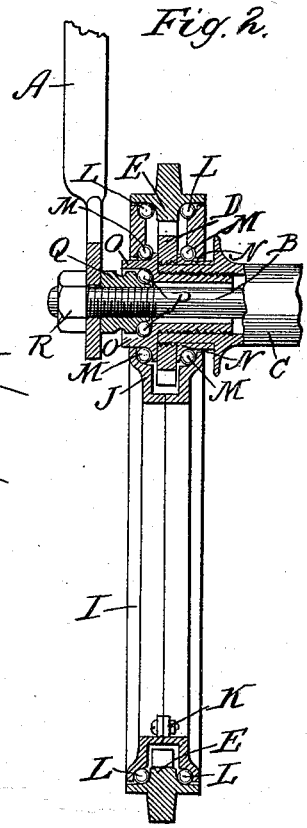
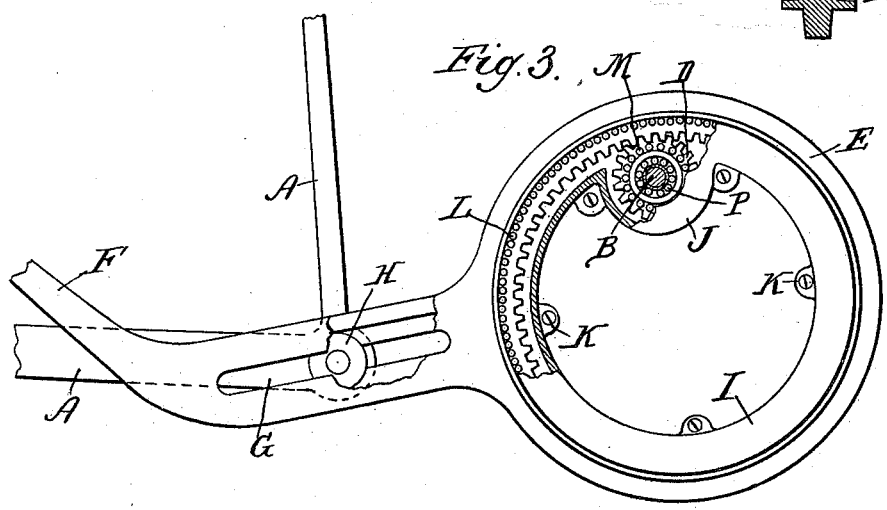
Witnesses.
Wm. M. Rheem
Harold G. Barrett
Inventor
F. C. Harding
by Raymond & Omohundro
att'ys

UNITED STATES PATENT OFFICE.

FRED C. HARDING, OF CHICAGO, ILLINOIS, ASSIGNOR OF THREE-FOURTHS TO RICHARD C. DANIEL, OF SAME PLACE, AND RICHARD B. DANIEL, OF SANBORN, IOWA.

BICYCLE DRIVING-GEAR.

SPECIFICATION forming part of Letters Patent No. 634,942, dated October 17, 1899.

Application filed July 20, 1898. Serial No. 686,426. (No model.)

*To all whom it may concern:*

Be it known that I, FRED C. HARDING, a citizen of the United States, residing at Chicago, in the county of Cook and State of Illinois, have invented certain new and useful Improvements in Bicycle Driving-Gear, of which the following is a full, clear, and exact specification, reference being had to the accompanying drawings, forming part thereof.

This invention relates to improvements in that class of bicycle driving-gear known as "rack and pinion," in which a circular rack attached to a pedal-lever is caused to engage a pinion upon the axle of the driving-wheel of the bicycle.

Of course my invention is applicable to any kind of vehicle; but for the purpose of convenience in illustration and description I will describe the same as applied to a bicycle.

The objects of my invention are to simplify the construction of such mechanism, to reduce the friction and number of parts thereof, as well as the weight, to render the same as near dust-proof as possible, to avoid the use of a pendulum-rod for the pedal-lever, and to generally promote the efficiency, simplicity, and economy in construction of driving-gear of this type. These and other objects as may hereinafter appear are attained by the devices illustrated in the accompanying drawings, in which—

Figure 1 represents a side elevation of a portion of a bicycle-frame and the driving-wheel thereof, showing my invention applied thereto. Fig. 2 represents a section on the line 2 2 of Fig. 1 looking in the direction indicated by the arrows. Fig. 3 represents a detail side elevation of one of the gear mechanisms, showing the same partly broken away to disclose the interior construction thereof.

Similar letters of reference indicate the same parts in the several figures of the drawings.

Referring by letters to the accompanying drawings, A indicates the rigid bars of the frame of a machine, B the axle of the rear wheel, and C the hub of the rear or driving-wheel, upon which is rigidly secured, preferably by a screw-thread connection, the pinion D, by which rotary motion is imparted to the driving-wheel of the machine.

With the pinion D meshes an annular internal rack E, formed upon or rigidly secured to the rear end of a pedal-lever F, which lever is provided with an elongated slot G, adjacent to the annular rack, for reception of an antifriction-roller H, loosely journaled upon the frame of the machine. The annular rack E is maintained in proper mesh with the pinion D by means of a split eccentric ring I, provided with a hub J, which is loosely journaled upon the hub C of the driving-wheel, so as to encompass the pinion. Both the eccentric ring and its hub J are split, as clearly illustrated in Fig. 2, so as to form two annular sections for convenience in assembling the parts and providing antifriction-bearings, as will be described farther on, the sections being rigidly secured together by bolts K passing through ears or lugs thereon or in any other suitable manner. It will thus be readibly seen that when pressure is applied to the pedal-lever the internal rack thereon will be caused to travel about the pinion on the driving-wheel and will be forcibly held continuously in mesh with the pinion by the interposition of the eccentric ring between the rack and the hub of the driving-wheel of the machine.

For the purpose of reducing friction and providing a compact and practically dust-proof gearing I have devised a particular disposition of the principal parts of my gearing, which consists, first, in providing races on the opposing faces of the sections of the eccentric ring and the annular gear for the reception of series of ball-bearings L, which serve to eliminate, as far as it is practicable, all friction between the eccentric ring and the annular gear. In the next place I provide races between the hub J of the annular ring and the hub C of the driving-wheel for reception of other series of ball-bearings M. In bringing about this result I prefer to use a cone N for the inner series of ball-bearings, which cone is slipped upon the end of the hub C of the driving-wheel and confined between a shoulder thereon and the pinion D, which latter is rigidly secured to the hub by an external screw-thread on the hub. The hub is also internally screw-threaded and a hollow or tubular nut O is screwed therein, having an external cone formed near the outer end thereof for the outer series of ball-bearings M. This nut is provided with a flanged head of greater diameter than the threaded opening through the pinion D, so that when the nut is screwed in place it serves as a lock-nut or keeper for the pinion. The nut is also provided at its outer end with an internal race for another series of ball-bearings P, which are confined in said race by a cone Q, screwed upon the end of the axle B and held in place by the nut R, also screwed upon the outer end of the axle, and between which nut and the cone is interposed the frame A, the ball-bearings P serving as the antifriction connection between the axle and the hub of the driving-wheel of the machine.

This entire arrangement is exceedingly simple and yet affords an efficient means of transmitting to the driving-wheel of the machine the power applied to the pedal-levers. It is also of compact form, yet light and practically dust-proof, and is easy of access, ready of repair, inexpensive, and durable.

Having described my invention, what I claim, and desire to secure by Letters Patent, is—

1. In a bicycle driving-gear, the combination of a rotary pedal-fulcrum secured to the frame, a pedal-lever formed with a longitudinal slot slidingly engaging on the rotary fulcrum, and carrying an internal annular rack on the rear end thereof, a pinion mounted on the end of the hub of the driving-wheel to mesh with the internal rack, and an eccentric ring formed with a hub journaled on the hub of the driving-wheel and inclosing the pinion.

2. The combination of the pedal-lever formed with an internal annular rack on one end, and fulcrumed to shift longitudinally, the driving-wheel, a pinion mounted on the hub of the driving-wheel to turn therewith, and a two-part eccentric ring formed with a hub inclosing the pinion and loosely journaled on the hub of the driving-wheel and disposed between the hub thereof and the annular rack, substantially as described.

3. In a driving-gear for bicycles, the combination with the driving-wheel, of an internal annular rack, means to actuate the rack, a pinion secured to the hub of the driving-wheel, an eccentric ring formed with a hub journaled on the hub of the driving-wheel and maintaining the annular rack in mesh with the pinion, a cone on the driving-wheel hub interposed between the pinion and shoulder on the said hub, a tubular nut or sleeve formed with an annular flange on its outer end and provided with internal and external cones, a nut secured on the axle of the driving-wheel and formed with a cone on its inner end, ball-bearings between said cone and the internal cone in the sleeve in the hub, and between the sleeve and the eccentric ring at one side of the pinion, between the cone on the hub and the eccentric ring on the other side of the pinion, and between the periphery of the ring and the annular rack.

4. In a driving-gear for bicycles, &c., the combination with a pedal-lever carrying an internal annular rack on one end thereof, an eccentric ring loosely journaled on the hub of the driving-wheel, and a pinion screwed onto the end of the hub of the driving-wheel, of a cone interposed between said pinion and a shoulder on said hub, a tubular nut screwed into the end of said hub and provided with a flanged head of greater diameter than the threaded opening through the pinion, a cone upon the axle of the driving-wheel and ball-bearings interposed between said cone and the nut and between said nut and the eccentric ring at one side of the pinion, between the cone on the hub and the eccentric ring on the other side of the pinion, and between the periphery of the ring and the annular rack, substantially as described.

FRED C. HARDING.

Witnesses:
W. R. OMOHUNDRO,
CORA WOOD.